United States Patent [19]

Quinn

[11] Patent Number: 4,460,853
[45] Date of Patent: Jul. 17, 1984

[54] GYROSCOPE WHEEL DYNAMIC BRAKING AND SEQUENCE INHIBIT CIRCUIT

[75] Inventor: James A. Quinn, Ridgewood, N.J.

[73] Assignee: The Singer Company, Little Falls, N.J.

[21] Appl. No.: 478,562

[22] Filed: Mar. 24, 1983

[51] Int. Cl.³ .......................... H02P 7/74; H02P 3/22
[52] U.S. Cl. ..................................... 318/86; 318/759; 318/102; 318/318; 318/314; 318/85
[58] Field of Search ................... 318/85, 86, 102, 103, 318/314, 618, 649, 648, 612, 760, 761, 810, 757

[56] References Cited

U.S. PATENT DOCUMENTS

| | | | |
|---|---|---|---|
| 3,694,716 | 9/1972 | Eland | 318/314 |
| 3,967,170 | 6/1976 | MacDonald et al. | 318/85 |
| 4,100,466 | 7/1978 | Schroeder | 318/102 |
| 4,295,086 | 10/1981 | Cutler et al. | 318/759 |
| 4,339,703 | 7/1982 | Rolff et al. | 318/318 X |

Primary Examiner—B. Dobeck
Assistant Examiner—Paul Shik Luen Ip

Attorney, Agent, or Firm—John C. Altmiller; Thomas W. Kennedy

[57] ABSTRACT

An inertial measuring unit gyroscope wheel dynamic braking and sequence inhibiting circuit is disclosed. The circuit comprises a first counter for counting a specified time interval and digital logic circuitry for applying an in-phase signal to the phases of a multiphase electric induction motor driving a gyroscope wheel during the time interval, for example, a vertical gyroscope motor wheel. By placing in-phase signals on the inputs of a multiphase electric induction motor, the motor is brought completely to rest in a short time by dynamic braking. In a preferred embodiment, a second counter counts a second specified time interval after the first time interval has terminated, during which second time interval a second electric induction motor is dynamically braked, for example, an azimuth gyroscope wheel motor. During the time period when the motors are braking, a signal is fed back to an automatic sequencing circuit to inhibit further sequencing of the inertial measuring unit.

13 Claims, 5 Drawing Figures

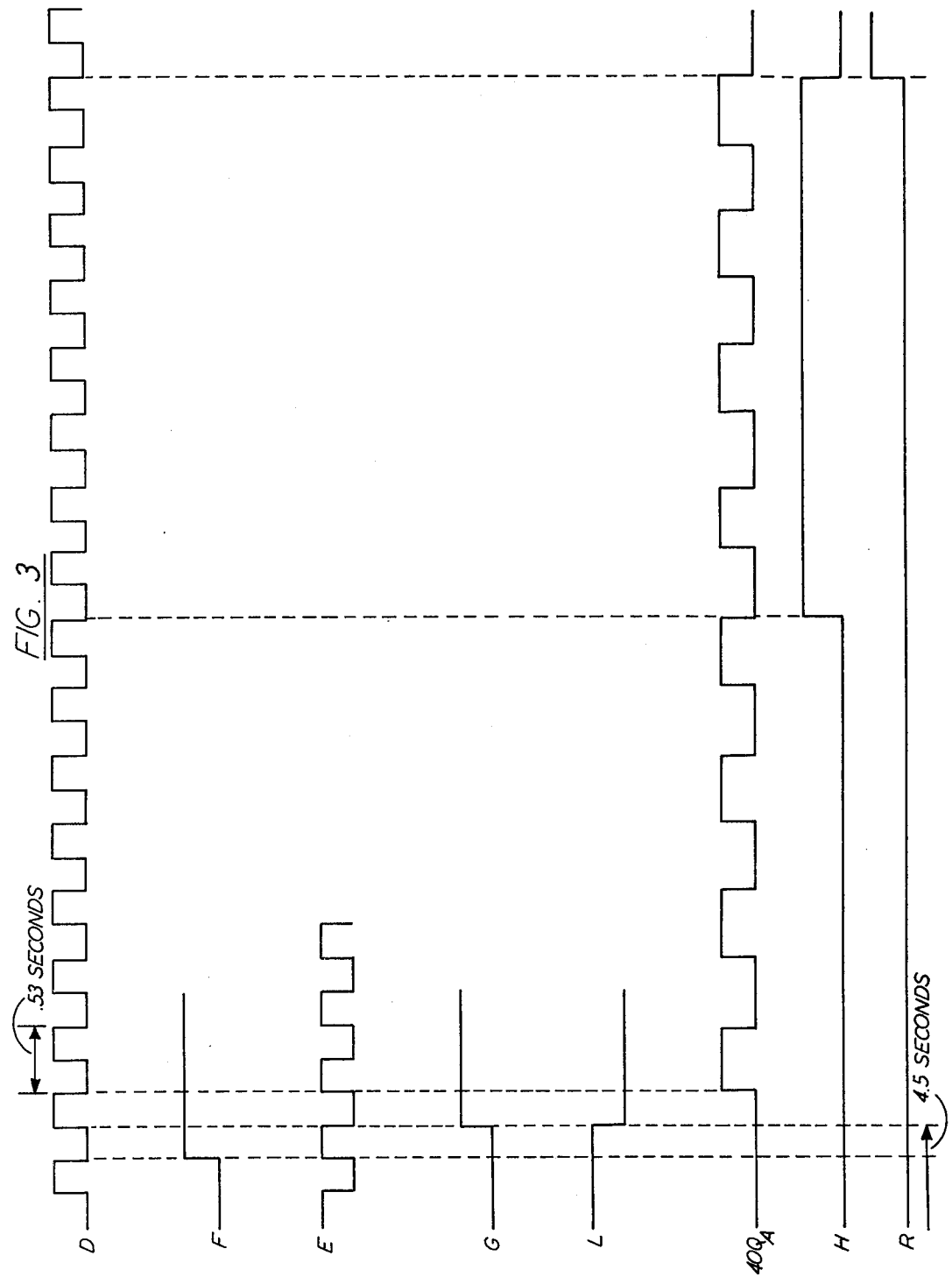

# 4,460,853

GYROSCOPE WHEEL DYNAMIC BRAKING AND SEQUENCE INHIBIT CIRCUIT

The Government has rights in this invention pursuant to Contract No. F33657-81-C-2046 awarded by the Department of the Air Force.

BACKGROUND OF THE INVENTION

1. Field of the Invention

The present invention relates to inertial Measuring Units (IMU's) in general and more particularly to a dynamic braking and sequence inhibit circuit for dynamically braking the gyroscope (gyro) wheel motors of IMU's and for inhibiting normal start-up sequencing until the gyro wheels are brought completely to rest.

2. Description of the Prior Art

IMU's are typically started up in a sequence of events controlled by a computer controlled sequencer which applies excitation to the gyro wheel motors, for example, the vertical and azimuth gyro wheel motors, at specific times. The usual sequence assumes that the gyro motors are not rotating at the start of the sequence. This is generally true on initial power-on. If the IMU is turned off and then on, and the gyro motors are still spinning at the start of the sequence, however, the IMU platform gimbals can tumble. The gimbals comprise the bearing structure which couples the external platform to the gyro housings in which the spinning gyro wheels are mounted via a flexure hinge suspension system and which maintains the gyro wheel axis despite changes in orientation of the external platform. If the IMU platform gimbals tumble, certain mechanical conditions are created which change the gyro restraint drift coefficient, or the angular rate of change in degrees per hour of the gyro spin axis direction in inertial space. Drift is caused by external torques acting on the spinning wheel via the gimbals and flexure hinge suspension system. These torques cannot be eliminated entirely in any practical IMU. Rather than attempting to adjust or trim these torques to absolute values consistent with high accuracy performance, it is a common practice to accurately measure the value of the drift and use it as a calibration parameter.

Gyro performance, therefore, is as stable as the net torques acting between the gyro housing and spinning wheel. Large external torques applied to the gyro housing can cause stresses resulting in very small (microinch) yielding of the hinge structure, changes in the residual torques and the drift performance. The primary source of external torques is the application of excessive angular rates to the gyro housing when the wheel is spinning.

During normal sequencing of an IMU platform, high angular rates ($\approx 5$ rad/sec) occur when the gimbals are caged prior to starting gyro motors. Caging minimizes drift by slaving the gyro spin axis to a fixed reference, for example, in the case of vertical gyros, to the vertical component of gravity. This does not normally cause performance shifts because no significant torques are encountered when the gyro wheel is not spinning and has no angular momentum. If the system, however, is temporarily turned off and immediately restarted, it is possible for high rates to be imposed before the gyro wheel has sufficiently slowed down. A method of rapidly braking the gyro motor is therefore a desirable feature to be added to the initial system sequence prior to caging to eliminate gyro performance shifts.

The known method for preventing the IMU sequence from starting while the gyro motors are spinning was to have a timer circuit keep the system deenergized at IMU turnoff for a period of 2 to 3 minutes. This allowed enough time for the gyroscope motors to come to a full stop, even from full speed, prior to starting the IMU again.

The known technique was never applied to flight system applications, because it would add 2 to 3 minutes to the normal system sequence. This additional length of time could not be tolerated in flight applications.

Accordingly, it is an object of the present invention to provide an apparatus for ensuring that the gyro motors are at rest in a relatively short time prior to restarting the gyro motors.

It is a further object of the present invention to provide an apparatus for generating an output signal to indicate to an IMU sequencing circuit that the gyro motors are at rest.

It is a yet further object of the present invention to provide such an apparatus which dynamically brakes the gyro induction motors by applying in-phase time-varying periodic signals to the multiple phases of the gyro induction motors.

It is a still further object of the present invention to provide a braking circuit which allows the gyro motors to be braked with the consumption of less power than consumed by the gyro motors during normal IMU operation.

SUMMARY OF THE INVENTION

These and other objects of the present invention are achieved in an inertial measuring unit including a gyroscope wheel, an electric induction motor having at least two phases for rotating the gyroscope wheel and means for generating control signals for controlling the electric induction motor, including a first control signal, a second time-varying periodic control signal and multi-phase control signals phased such as to develop a driving torque in said electric induction motor, wherein the improvement comprises logic means, coupled to the means for generating and the electric induction motor and having the first and second control signals as inputs, for coupling the second control signal simultaneously and substantially in phase to each of the phases of the electric induction motor in response to the first control signal so as to develop a braking torque in the electric induction motor.

BRIEF DESCRIPTION OF THE DRAWINGS

FIG. 3 is a timing diagram of certain of the signals present in the logic diagram of FIG. 1;

DETAILED DESCRIPTION

Figure 1:
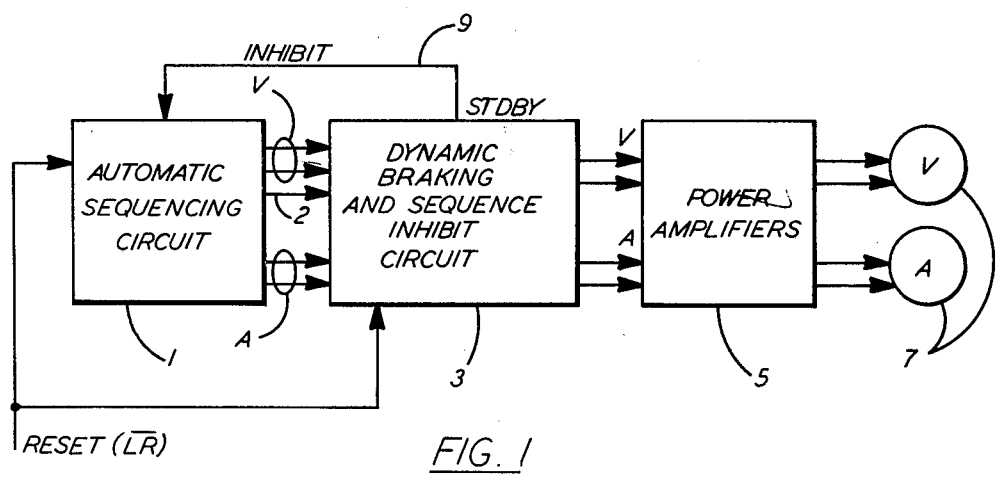
FIG. 1 is a block diagram of a control system for sequencing an IMU according to the present invention.

With reference now to the drawings, FIG. 1 is the block diagram of the sequencing apparatus of an IMU according to the present invention. The IMU shown includes two gyro motors controlling vertical and azimuth gyros. The sequencing apparatus includes automatic sequencing circuit 1 which controls the sequence of events after the IMU is powered-on. A reset control signal (LR), generated whenever the IMU is powered on, is fed to the automatic sequencing circuit and the dynamic braking and seqence inhibit circuit 3. Control signals from the sequencing circuit including multiphase control signals V and A phased such as to develop a driving torque in the electric induction motors 7 and time-varying periodic signal 2 are fed to the dynamic braking and sequence inhibit circuit 3. Control signals for either driving or braking the gyro wheel motors are fed to the power amplifier circuitry 5 and thence to the individual gyro motors 7. During the time period when the motors are braking, circuit 3 keeps the sequencing circuit inhibited via the feedback line 9.

Figure 2:
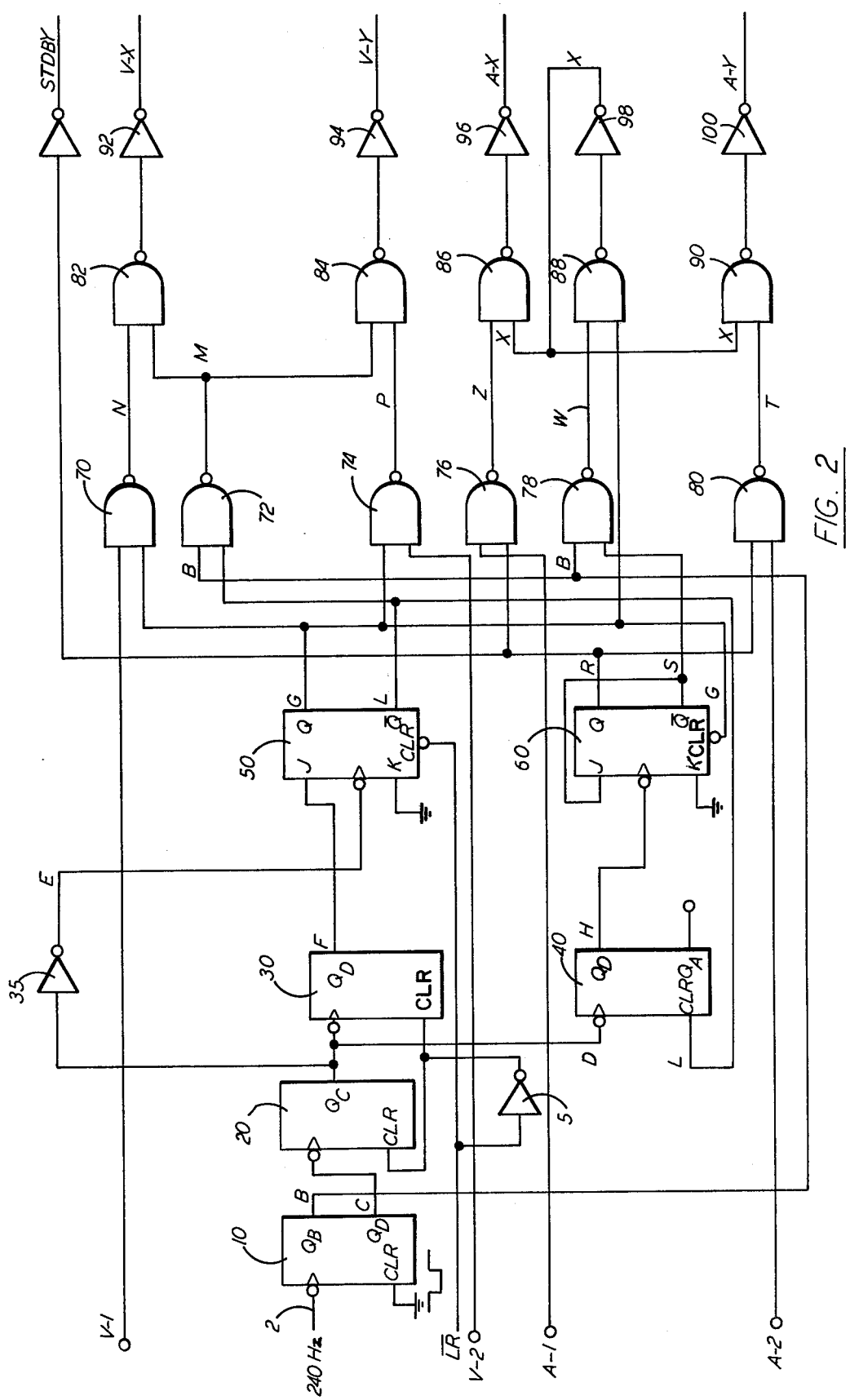
FIG. 2 is a logic diagram of a preferred embodiment of the dynamic braking and sequence inhibit circuit according to the present invention and shown as one of the blocks in FIG. 1.

FIG. 2 illustrates the logic diagram for a preferred embodiment of the gyroscope wheel dynamic braking and sequence inhibit circuit 3 of FIG. 1.

In the illustrated embodiment the IMU comprises two gyros, a vertical gyro and an azimuth gyro, and the electric induction motors are two-phase motors.

Input lines V-1 and V-2 as shown in FIG. 2 are the vertical gyro wheel motor control lines. Input lines A-1 and A-2 are the azimuth gyro wheel motor control lines Table 1 illustrates the typical start-up procedure of an IMU by the automatic sequencing circuit. The circuit illustrated in FIG. 2, has, as one of its objects, the inhibiting of the sequence shown in Table 1 until the time designated X, i.e., the time when the motors are completely at rest. Although Table 1 will be explained in more detail below an understanding of the IMU start-up sequence will be helpful in understanding the invention. Assuming a normal start-up of the IMU, i.e., normal start-up sequence from the time when both vertical and azimuth gyro motors are completely at rest (time X in Table 1) lines V-1 and V-2 will have 90° out of phase 240 Hz signals applied thereto by the sequencer at 6.4 secs after time X Step 4). At approximately 12.8 secs (Step 6) after time X, 90° out of phase 240 Hz signals are applied to lines A-1 and A-2 and the vertical gyro motor is at the same time deenergized. At approximately 14.9 secs (Step 7), the vertical gyro motor is reenergized with 240 Hz signal input and then the sequencer switches all four lines to 500 Hz control. Typically, induction motors are used in IMU's. As is well known in the art, maximum driving torque from induction motors is obtained when the angle between the motor phases is 90°. Thus, when lines V-1 and V-2 and A-1 and A-2 are 90° out of phase, respectively, this corresponds to normal IMU operation. As will be explained in detail below, the 90° out of phase signals are fed to output lines V-X and V-Y and A-X and A-Y, respectively, by the circuit shown in FIG. 2 during normal IMU operation. Output lines V-X and V-Y are coupled to power amplifiers controlling the vertical gyro motor and lines A-X and A-Y are coupled to the power amplifiers controlling the azimuth gyro motor. When normal sequencer operation is to be inhibited and the vertical and azimuth motors braked, the circuit shown in FIG. 2 will apply in-phase periodic signals to both phases sequentially to the two motors, first to output lines V-X and V-Y and then to output lines A-X and A-Y. The application of in-phase time varying periodic signals causes maximum dynamic braking of the gyro motors because when the angle between the two phases is 0°, there is no driving torque but only the braking torque of the shorted turns of the rotor cutting the lines of magnetic flux generated by the applied voltages. An optimum frequency for the purposes of the invention has been found to be 60 Hz. Higher frequencies would increase the braking time, while lower frequencies will increase the current drawn.

TABLE 1

| STEP | TIME (SEC.) | ACTION |
|---|---|---|
| 1 | 0 | Warm-up power applied to platform heaters. |
| 2 | X | Cage pitch and outer roll gimbals |
| 3 | X + 2.1 | Cage inner roll and azimuth gimbals |
| 4 | X + 6.4 | Start vertical gyro wheel at 240 Hz. |
| 5 | X + 8.5 | Close pitch and inner roll gimbal loops in low gain isolation mode. Close outer roll gimbal loop. |
| 6 | X + 12.8 | Switch pitch and inner roll gimbal loops to high gain isolation mode. Remove excitation from vertical gyro wheel. Start azimuth gyro wheel at 240 Hz. |
| 7 | X + 14.9 | Close azimuth gimbal loop in low gain isolation mode. Reapply excitation to vertical gyro wheel. Switch both gyro wheel excitations from 240 Hz to control loop drive, approximately 500 Hz. |
| 8 | X + 19.2 | Switch azimuth gimbal loop to high gain isolation mode. Close redundant gyro axis loop. Close high rate first order erect loops. |
| 9 | X + 36.2 | IMU ready. Place IMU under computer control. |

The operation of the circuit shown in FIG. 2 may now be discussed in more detail. When the IMU is first turned on, a negative going logic reset pulse lasting approximately 2 secs is applied to line $\overline{LR}$. This pulse clears clocked JK flip-flop 50, thus setting its Q output on line G to O. Inverter 5 couples the pulse on line $\overline{LR}$ to the clear inputs of 4 bit binary ripple counters 20 and 30. The clear input of counter 10 is coupled to logic 0, so that it is continually in a counting state. These binary ripple counters may be, for example, TTL type 54/74LS93 or type 54/74LS393 counters in which two 4 bit counters are packaged in one DIP integrated circuit. Thus the outputs of counters 20 and 30 are all set to 0 by pulse $\overline{LR}$. Once line $\overline{LR}$ goes back to logic 1, the counters 20 and 30 and flip-flop 50 are enabled. A 240 Hz signal is applied on line 2, the clock input of counter 10. Counter 10 is utilized to divide down the input 240 Hz signal. The $Q_B$ output, line B, is the 240 Hz signal divided by 4, i.e., 60 Hz. This 60 Hz signal is the control signal for braking the motors prior to time X in Table 1.

This 60 Hz signal is applied via logic gates 70, 72, 74, 82, 84, 92 and 94 to lines V-X and V-Y in phase from the start of the $\overline{LR}$ pulse until flip-flop 50 sets, i.e., until line G goes to logic 1. Until flip-flop 50 sets, as will be explained below, line L remains at a logic 1, thus enabling NAND gate 72. Thus, the 60 Hz signal, inverted by NAND gate 72, is coupled to one input of NAND gate 82 and one input of NAND gate 84 on line M. Lines N and P, however, are at logic 1 levels, because line G is at a logic 0, thus disabling NAND gates 70 and 74 at this time and thereby placing a logic 1 level on lines N and P. The logic 1 levels on lines N and P enable NAND gates 82 and 84, and the 60 Hz signal, inverted another time by each of NAND gates 82 and 84 and again by each of inverters 92 and 94, is coupled in-phase to output lines V-X and V-Y to dynamically brake the vertical motor.

Counter 10 line $Q_D$, line C, has a frequency 1/16 that of the signal on line 2. Line C is coupled to the clock input of a second 4 bit binary counter 20. The $Q_C$ output of counter 20 provides an additional divide by 8, so that the signal on line D is 1/128 the frequency on line 2, or 1.875 Hz. The 1.875 Hz signal on line D is applied to the clock inputs of third 4 bit binary counter 30 and fourth 4 bit binary counter 40.

The explanation of the further operation of the circuit of FIG. 2 is aided by the timing diagram shown in FIG. 3. The $Q_D$ output of counter 30, line F, goes to a logic 1 after 8 cycles of the 1.875 Hz signal at its clock input, or approximately 4.27 secs after the 2 sec $\overline{LR}$ pulse has terminated. This places a logic 1 on the J input of JK flip-flop 50, the K input of which is tied to logic 0. Flip-flop 50, like counters 10, 20, 30 and 40, is negative edge triggered. Thus, when the negative edge appears on line D which causes line F to go to a logic 1, a rising edge appears in line E due to inverter 35. Flip-flop 50 is thereby clocked approximately one-half clock cycle after line F goes to a logic 1 or approximately 0.27 secs after line F goes to logic 1 before setting as shown in FIG. 3. Thus, line G goes to a logic 1 approximately 4.27+0.27=4.54 secs after the $\overline{LR}$ pulse has terminated. A logic 1 on line G is thus coupled to one input of each of NAND gates 70, 74 and 88 and the clear input of J-K flip-flop 60. Lines V-1 and V-2 are both kept at logic 1 levels at this time by the sequencing circuit as will be explained below with reference to line STDBY, and thus the outputs of NAND gates 70 and 74, lines N and P respectively, both go to logic 0 when flip-flop 50 sets. Flip-flop 60 is also enabled at this time due to the logic 1 on its clear input. Line R, however, remains at logic 0 level, thus maintaining control line STDBY at a logic 1. The logic 1 level on line STDBY is coupled back to the automatic sequencing circuit and provides an indication to the sequencing circuit that the gryo motors are being braked.

When flip-flop 50 sets, line L goes to a logic 0, thus disabling NAND gate 72 and enabling counter 40, which had been disabled up to this time. Thus, the output of NAND gate 72 goes to a logic 1, and the 60 Hz signal on line B is decoupled from output line V-X and V-Y. This occurs approximately 4.54 secs after the $\overline{LR}$ pulse has terminated and the vertical motor braking thus takes place for 6.54 secs, or the sum of the 2 sec. $\overline{LR}$ reset time and 4.54 secs. When NAND gate 72 is disabled, a logic 1 appears at its output on line M. Lines N and P are forced to logic 0 at this time as explained above, thus placing a logic 0 on output lines V-X and V-Y. During the time period when the vertical gyro is being braked, the azimuth gyro is deenergized, i.e., no signal is present on lines A-X and A-Y.

Until the time when the 60 Hz in phase signals are removed from lines V-X and V-Y, flip-flop 60 is disabled, i.e., a logic 0 on line G keeps the flip-flop cleared. Line R is thus at a logic 0. Similarly, counter 40 is kept in a disabled state by the logic 1 condition on line L until the same time. When flip-flop 50 sets, flip-flop 60 and counter 40 are enabled.

When flip-flop 50 sets and flip-flop 60 and counter 40 are enabled, line G goes to a logic 1. Flip-flop 60 remains in its reset state, i.e., line R is a logic 0 and line S is a logic 1. The 60 Hz signal on line B is thus coupled to line W by NAND gate 78 in an inverted state. The logic 1 level on line G enables NAND gate 88. The 60 Hz signal is thus gated to inverter 98 and NAND gates 86 and 90 via line X, which each pass the 60 Hz signal because each of their other inputs is at a logic 1 due to the fact that NAND gates 76 and 80 have a logic 0 at one input on line R. Thus, the 60 Hz signal, after inversion by inverters 96 and 100, is present on lines A-X and A-Y, therefore causing the azimuth gyro motor to be dynamically braked.

During this time, counter 40 counts through 7.5 clock cycles of the 1.875 Hz signal on line D after it is enabled, as shown in FIG. 3. After these 7.5 clock cycles, on a falling edge of the signal on line D, a rising edge appears at the $Q_D$ output of counter 40 and this is coupled on line H to the clock input of flip-flop 60. Flip-flop 60, however, is falling edge triggered, so that another 8 clock cycles of the 1.875 Hz signal on line D occur before flip-flop 60 is clocked. When the falling edge occurs, flip-flop 60 sets due to the coupling of its $\overline{Q}$ output to the J input. Thus, the Q output goes high, line R goes to a logic 1 and line S to a logic 0 as shown in FIG. 3. This occurs approximately 15.5 clock cycles of the 1.875 Hz signal after flip-flop 50 sets or 8.26 secs after flip-flop 50 sets.

Figure 5:
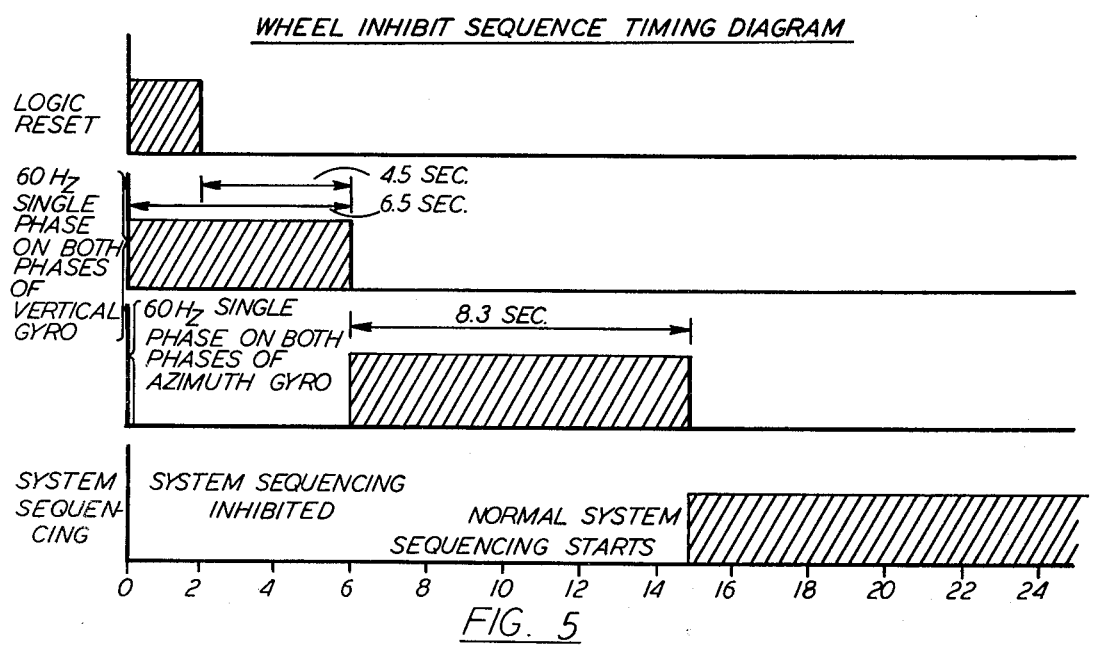
FIG. 5 is a timing diagram of the IMU start-up operating sequence including the operation of the circuit according to the invention.

When line R goes to a logic 1 and line S goes to logic 0, NAND gate 78 is disabled, thereby removing the 60 Hz signal from line W and placing a logic 1 on line W. Line G is at a logic 1 level and the output of NAND gate 88 thus goes to a logic 0 and inverter 98 places a logic 1 on line X. Because line R is at a logic 1 level due to the setting of flip-flop 60 and lines A-1 and A-2 are held at logic 1 by the sequencing circuit, both lines T and Z are at logic 0 level. Thus, a logic 1 appears at the outputs of both NAND gates 86 and 90 and inverters 96 and 100 provide a logic 0 level on lines A-X and A-Y. At the same time, line STDBY goes to logic 0, thus indicating to the sequencing circuit that both motors have been brought to rest and that further sequencing of the IMU according to table 1 can continue. Thus, the circuit shown in FIG. 2 has performed the following sequence as shown in FIG. 5:

Approximately for 6.5 secs (6.54 secs) from the start of the 2 sec LR pulse, the vertical motor is dynamically braked via the 60 Hz in phase signal on lines V-X and V-Y. After 6.5 secs has elapsed, lines V-X and V-Y go to logic 0. At the same time, a 60 Hz in phase signal is applied to lines A-X and A-Y. For approximately the next 8.3 secs (8.26 secs), the azimuth motor is dynamically braked. Thus, during the first 14.8 secs, the vertical and azimuth motors are braked in sequence. At the conclusion of the 14.8 sec. interval, line R goes to a logic 1 level, and line STDBY goes to a logic 0 level, thus indicating to the sequencing circuit that the gyro motors are at rest and enabling the sequencing circuit to continue sequencing of the IMU.

Table 1 shows the sequence of events occurring from power-turn on of the IMU. Step 1 indicates power turn-on. The gyro platform heaters are turned on so that the gyros are brought to operating temperature. Time X at step 2 is the greater of two times, the time for gimbal temperatures to reach a specified operating temperature (approximately 18° F.) or the time required for the operation of the circuit of FIG. 2, approximately 14.8 secs after the start of the 2 sec $\overline{LR}$ pulse. Steps 2 and 3 indicate the times when the gyros are caged to their respective references. At 6.4 secs after time X, or step 4, the vertical gyro motor is energized. This corresponds to the time when 240 Hz 90° out of phase signals are applied to lines V-1 and V-2 in FIG. 2. As shown by FIG. 2, the pulsing signals on lines V-1 and V-2 are coupled to lines V-X and V-Y by gates 70, 82 and 92 and 74, 84 and 94 because lines G and M are at logic 1 levels at this time. At step 6, or 12.8 secs after time X, the azimuth gyro wheel is energized by the application by the sequencing circuit of 240 Hz 90° out of phase signals to line A-1 and A-2 in FIG. 2. These signals are coupled to lines A-X and A-Y by gates 76, 86 and 96 and 80, 90 and 100 because lines R and X are at logic 1 levels at this time. At the same time, the vertical motor is deenergized. 14.9 secs after time X, or step 7, both gyro wheels are switched to 500 Hz operation. This corresponds to the application of 500 Hz 90° out of phase signals to lines V-1 and V-2 and A-1 and A-2, respectively which are coupled to the appropriate output lines V-X, V-Y, A-X and A-Y. Approximately 36.2 secs after time X, or step 9, the IMU is ready and is placed under computer control by the sequencing circuit. The sequence steps and terms noted in Table 1 and not described herein refer to steps in the sequencing of the IMU known to those skilled in the art and having no relevance to the operation of the invention.

Figure 4:
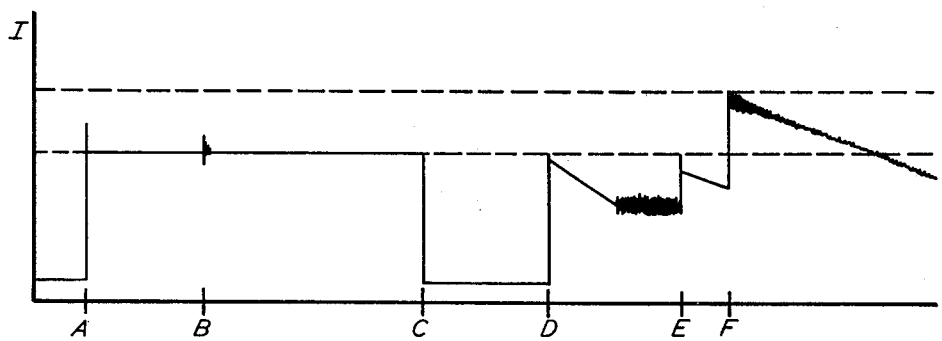
FIG. 4 is a graphical illustration of the current consumed by the IMU during the braking and sequencing modes.

FIG. 4 indicates the current drawn by the gyro wheel motors during a full start-up sequence including the dynamic braking applied by the circuit of FIG. 2. As shown, the gyro wheel motors draw less current during braking than the peak current drawn during normal driving operation. In FIG. 4, the period from A to B is the 4.5 sec interval during which the vertical motor is being braked; from B to C is the 8.3 sec interval during which the azimuth motor is being braked; from C to D is the 6.4 sec time interval before energization of the vertical motor; from D to E the vertical motor is energized at 240 Hz; from E to F, the azimuth motor is likewise energized and the vertical motor is deenergized. From time F and forward, both motors are energized at 500 Hz excitation.

On initial turn on of the IMU, when the gyro motors are at rest, the single phasing of the motors due to the operation of the invention will heat up the motor windings to a small extent, but will not cause any system problems in normal operation other than adding approximately 14.8 secs. to the system sequence if the motors are already at operating temperature.

In the foregoing specification, the invention has been described with reference to a specific exemplary embodiment thereof. It will, however, be evident that various modifications and changes may be made thereunto without departing from the broader spirit and scope of the invention as set forth in the appended claims. For example, the time periods and frequencies described herein could be changed and different logic circuitry could be employed while still remaining within the scope of the invention. The specification and drawings are, accordingly, to be regarded in an illustrative rather than in a restrictive sense.

What is claimed is:

1. In an inertial measuring unit including a gyroscope wheel, an electric induction motor having at least two phases for rotating said gyroscope wheel and means for generating control signals for controlling said electric induction motor, including a first control signal, a second time-varying periodic control signal and multiphase control signals phased such as to develop a driving torque in said electric induction motor, the improvement comprising:

logic means, coupled to said means for generating control signals and said electric induction motor and having said first and second control signals as inputs, for coupling said second control signal simultaneously and substantially in phase to each of the phases of said electric induction motor in response to said first control signal so as to develop a braking torque in said electric induction motor.

2. The improvement recited in claim 1 wherein said inertial measuring unit includes a second electric induction motor having at least two phases, and said logic means includes means for sequentially coupling said second control signal simultaneously and substantially in phase to each of the phases of each of said electric induction motors in response to said first control signal so as to sequentially develop a braking torque in each of said electric induction motors.

3. The improvement recited in claim 1 wherein said logic means comprises:

first counting means, having means for receiving said second control signal as an input, for counting a first specified time period and for generating a third control signal after said first time period has terminated; and first digital logic gating means coupled to said first counting means, and having means for receiving said third control signal as an input and having means for receiving said second control signal as an input, said first gating means coupling said second control signal to the phases of said electric induction motor and decoupling said second control signal from said electric induction motor when said third control signal is generated.

4. The improvement recited in claim 3 wherein said inertial measuring unit further includes a second electric induction motor and wherein said logic means further comprises:

second counting means, coupled to said first counting means, and having means for receiving said third control signal as an input, for counting a second specified time period in response to said third control signal and for generating a fourth control signal after said second time period has terminated; and second digital logic gating means having means for receiving said fourth control signal as an input and having means receiving said second and third control signals as inputs, said second gating means coupling said second control signal to the phases of said second electric induction motor when said third control signal is generated and decoupling said second control signal when said fourth control signal is generated.

5. The improvement recited in claim 3 wherein said second control signal is coupled to said gating means by frequency division means, said frequency division means forming a reduced frequency signal.

6. The improvement recited in claim 5 wherein said reduced frequency signal comprises a substantially 60 Hz signal.

7. The improvement recited in claim 3 wherein said first gating means includes means for receiving said multiphase control signals as inputs for coupling said multiphase control signals to respective phases of said electric induction motor.

8. The improvement recited in claim 4 wherein said means for generating produces multiphase control signals for each of said electric induction motors phased such as to develop a driving torque in each of said electric induction motors and said first and second gating means include means for receiving said respective multiphase control signals as inputs for coupling said multiphase control signals to respective ones of said electric induction motors.

9. The improvement recited in claim 1 wherein said electric induction motor comprises a two phase motor.

10. The improvement recited in claim 2 wherein said electric induction motors comprise two phase motors.

11. The improvement recited in claim 1 wherein said means for generating comprises inertial measuring unit control sequencing means and said logic means includes means for supplying a signal to said sequencing means for indicating when a braking torque is being developed in said electric induction motor and inhibiting said sequencing means.

12. A method for braking a spinning multiphase electric induction motor driving a gyroscope wheel comprising the steps of:
   generating a time-varying periodic signal;
   generating a control signal; and
   applying said time-varying periodic signal simultaneously to the multiphase inputs of said electric induction motor for a first specified time interval in response to said control signal so as to develop a braking torque in said electric induction motor and bring said electric induction motor to rest.

13. The method recited in claim 12 further comprising the steps of:
   generating a further control signal after said first specified time interval has terminated; and
   applying said time-varying periodic signal simultaneously to the multiphase control inputs of a second multiphase electric induction motor for a second specified time interval in response to said further signal so as to develop a braking torque in said second electric induction motor and bring said second electric induction motor to rest, said second electric induction motor developing said braking torque after said first specified time interval has terminated.

* * * * *